March 29, 1932.   J. P. TARBOX   1,851,220
COVER FASTENING FOR AIRCRAFT
Filed June 23, 1930

INVENTOR.

Patented Mar. 29, 1932

1,851,220

UNITED STATES PATENT OFFICE

JOHN P. TARBOX, OF PHILADELPHIA, PENNSYLVANIA, ASSIGNOR TO EDWARD G. BUDD MFG. COMPANY, OF PHILADELPHIA, PENNSYLVANIA, A CORPORATION OF PENNSYLVANIA

COVER FASTENING FOR AIRCRAFT

Application filed June 23, 1930. Serial No. 462,962.

This invention relates to surface covering fastening devices adapted to secure in place the coverings of aerofoils of all descriptions.

The principal object of the invention is to provide a device which may be employed for securing in place the coverings of the frame work of aircraft bodies, whether these coverings be employed on the aerofoil sections, fuselage, tail planes or elsewhere, and whether the coverings be formed of fabric or of sheet metal.

The invention is particularly adapted for use in connection with the securing of fabric coverings to metal framework in which the chord members or ribs and struts are angular or channel shape in cross section, but the invention is also adapted for securing fabrics to all manner of framework, whether wooden or metal.

The present method of securing fabrics to the framework is laborious and consists in stringing connections between the under side and the upper side of the framework in such a manner as to commonly unite the two sides. This method possesses the disadvantage not only of being a time consuming process, but of being generally unsatisfactory from the standpoint of operation, such stringing connections being subject to stretching.

Accordingly the present invention has for an object the provision of a device for securing covering material to a framework which may easily be applied without necessitating the use of awls, punches, or other tools, thereby reducing the cost of attachment of coverings in general.

A still further object of the invention is to provide an attaching means which may be formed of stainless steel and which consequently is not subject to deterioration.

Yet another object of the invention is to provide an attaching means which may be manufactured at a minimum cost and one which is light in its construction.

In carrying out the above objects the covering material is secured to the ribs or any other members by means of a fastening device having a plurality of shanks having barbed or shear head points adapted in themselves to pierce the covering and extend into the wings or other portions of the airplane and engage the ribs. The shanks of these devices are connected to or formed on resilient clamping devices to normally urge the barbed portion of the shanks against the edges of the ribs.

With these and other objects in view, which will more readily appear as the nature of the invention is better understood, the same consists in the novel construction and arrangement of parts shown in the accompanying one sheet of drawings, in which.

In all of the above described views, like characters of reference are employed to designate like parts throughout.

In the preferred form of the invention, the fastening means is comprised of a pair of strands of rustless spring steel wires 10 and 11 twined or twisted upon themselves throughout a substantial length medially of their ends. The adjacent portions of the wires at each end of the twisted portion diverge outwardly to points 12 and 13 spaced apart a distance substantially equal to the width of the chord member or rib to which the covering is to be attached. From these points the wires extend downwardly in parallel relation to provide four tines 14, 15, 16, and 17. Formed on the lower end of each of these tines is an inwardly directed single prong hook member 18 resembling in appearance a common, pointed fish hook. These hooks are adapted to engage the lower edges of the side walls of the chord member, rib, strut, etc. The tines 14 and 15, while remaining substantially parallel, are sprung slightly inwardly to insure effective engagement with the lower edges of the channel section. The diverged portions together with the connecting twisted portion are bowed downwardly so that when the attaching member is positioned on a channel section with the hooks in engagement with the edges of the same, the hooks are normally urged upwardly into engaging position to prevent dislodgment of the device.

When the fabric is positioned on the framework, it is merely necessary for the artisan to locate the chord or rib member by feeling for the ridge in the fabric material caused by contact of the same with the rib. The hooks or spear heads may then be forced into the fabric on either side of the channel section by depressing the divergent arms on each side of the twisted portion. Inasmuch as the tines 14 and 15, and 16 and 17 are sprung slightly inwardly, the hooks are automatically slipped into engagement with the lower edge of the channel section. Thus, the attaching means will be properly and permanently positioned for securely holding the fabric in place.

Figures 1, 2:
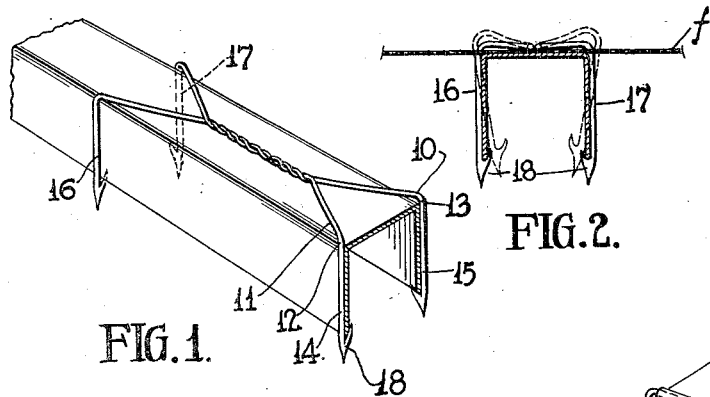
Fig. 1 is a perspective view of a channel shaped rib, chord member or the like, showing the attaching means secured in position thereon.
Fig. 2 is a section view taken substantially along the line 2—2 of Fig. 1.
Figure 3:
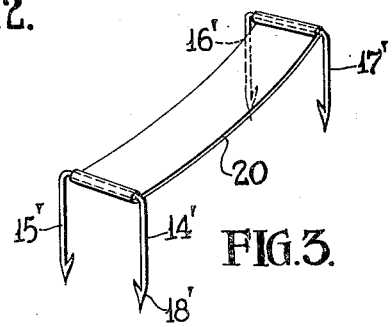
Fig. 3 is a perspective view of a modified form of attaching means.

In Fig. 3, modified form of the invention is shown. In this figure, the clamping means is shown as being formed of a flat strip of metal 20 bowed upwardly slightly and having formed on each end a rolled, hollow knurl. Extending into these knurls respectively are the bights of a pair of U-shaped wire members having downwardly extending inwardly sprung tines 13', 14', 15', 16' and 17' having inwardly extending hooks 18' thereon similar to the hooks 18. The device shown in this modification is adapted for use not only in engagement with single rib sections as is the case shown in Fig. 1, but such a device may be positioned with the flat sheet metal portions 14 clamped against the fabric on a rib member and with the hook members engaging intersections of chord members or the like. The tines 14', 15', 16', 17' being pivoted in the knurls are adapted to swing out of the vertical position to engage such intersections where practicable.

Figure 4:
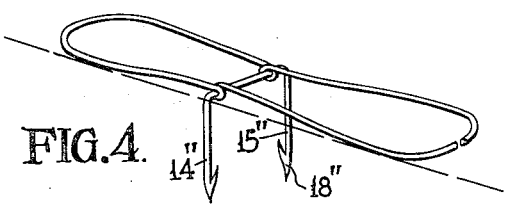
Fig. 4 is a perspective view of a still further modified form of attaching means.
Figure 5:
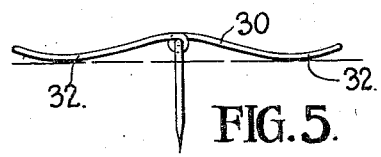
Fig. 5 is a side elevation of the device shown in Fig. 4.

In the modification shown in Fig. 4, the attaching means is shown as being formed in two lengths of rustless, spring steel wire. The clamping member is shown at 30 and comprises a continuous loop of wire bowed downwardly and having clamping surfaces 32 for engagement with the fabric. The loop is generally in the form of a narrow ellipse and has on the opposite sides of its minor axis a pair of aligned loops through which extends a unit similar to the unit 14'—15', in Fig. 3. This unit has downwardly extending inwardly sprung tines 14"—15", and has a hook arrangement 18" formed on the lower end thereof and adapted to engage the lower edges of the channel section or interconnection thereof. In attaching this form of device, the artisan may slightly spread the tines and force the same through the fabric on each side of the channel section and by depressing the center portion of the clamping member 30, the hooks will act as latches to prevent removal of the device. (See Fig. 5.)

Figure 6:
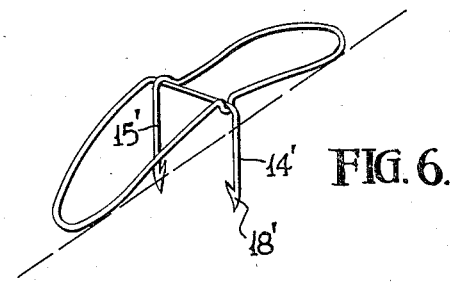
Figs. 6 and 7 are perspective views of additional forms of the fastening means.

In Fig. 6 a still further modified form of the invention is shown. In this form of the invention, the securing means is formed generally in the shape of the article described in connection with Figs. 4 and 5, but of a single length of stainless steel wire. Each end of the wire is provided with a hook $18_1$. The depending tines $14_1$ and $15_1$ are slightly sprung inwardly for the reason outlined above in connection with Figs. 4 and 5 and the wire is continuous from one hook $18_1$ to the other. The device is inserted in position on a channel section in the same manner as the device shown in Figs. 4 and 5, and as the members 14 and 15 are upwardly biased by means of the loop, a locking effect is obtained.

Figure 7:
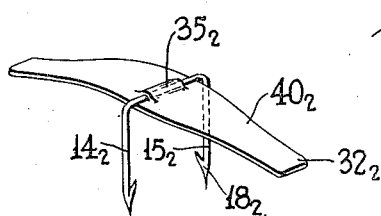

In Fig. 7 an additional form of the invention is shown and in this figure, the clamping member comprises a sheet of metal $40_2$ bowed downwardly to provide a clamping portion $32_2$. The sheet $40_2$ is provided at its center portion with an up-struck strap $35_2$ through which strap extends a securing unit similar to the securing unit shown in Figs. 3, 4, and 5. As is the case with the device shown in Figs. 3, 4, 5, so, in this instance are the downwardly extending tines $14_2$ and $15_2$ inwardly sprung to permit the hooks $18_2$ to engage the edges of the channel connection. The device shown in this figure may be attached in a manner similar to the manner shown in Figs. 4, 5, or 6.

What I claim is:

1. A surface covering fastening for aerofoils comprising a U-shaped clip, the shanks of which are provided with reversely barbed points adapted in themselves to pierce the cover and engage under the framework at the opposite sides of a frame member.

2. A surface covering fastening for aerofoils comprising a U-shaped clip having means on the ends of its shank to engage under the aerofoil framework, and means connected with its bight and extending laterally of the plane of the clip to engage the surface covering and retain the same in place.

3. An aeroplane surface cover fastening comprising a clip, the shanks of which are provided with ends shaped to pierce the cover and engage under the framework, and means on the clip at substantially right angles to the plane of the shanks to engage the covering laterally thereof and retain the same in place.

4. A unitary surface covering fastening device comprising shanks shaped to pierce the covering and engage under a framework, and means connected with the shanks adapted to engage the surface covering and bear the same upon the framework, which means symmetrically engage the framework and the covering as respects the vertical plane transversely of the fastening device intermediate its ends.

5. A surface covering fastening device for aerofoils comprising a U-shaped clip, the ends of the shanks of which are converged toward each other and provided with pointed hooked ends to pierce the covering and to engage under an aerofoil framework, and the bight of which is resilient and when the device is in position, resiliently bears the shanks against the sides of the framework.

6. An aerofoil covering fastening device comprising a pair of wire strands twisted together in their middles, branched substantially in a common plane at their ends, and having their ends projected substantially at right angles to said plane commonly in the same direction and provided with means to engage under the aerofoil framework.

7. An aerofoil covering fastening device comprising a pair of wire strands twisted together in their middles, branched substantially in a common plane at their ends, and having their ends projected substantially at right angles to said plane commonly in the same direction and provided with means to engage under the aerofoil framework, and provided in its main body with a slight bow toward the ends.

In testimony whereof I hereunto affix my signature.

JOHN P. TARBOX.